Dec. 3, 1929.    J. W. COSGROVE    1,737,829
CONVEYING SYSTEM
Filed Jan. 17, 1924    2 Sheets-Sheet 1

INVENTOR
John W. Cosgrove
By his Attorney,
Nelson W. Howard

Dec. 3, 1929.  J. W. COSGROVE  1,737,829
CONVEYING SYSTEM
Filed Jan. 17, 1924   2 Sheets-Sheet 2

INVENTOR-
John W. Cosgrove

Patented Dec. 3, 1929

1,737,829

UNITED STATES PATENT OFFICE

JOHN W. COSGROVE, OF MEDFORD, MASSACHUSETTS, ASSIGNOR TO UNITED SHOE MACHINERY CORPORATION, OF PATERSON, NEW JERSEY, A CORPORATION OF NEW JERSEY

CONVEYING SYSTEM

Application filed January 17, 1924. Serial No. 686,823.

My invention relates to systems for conveying objects. Such objects may have been moistened or coated with an adhesive, the conveying system receiving them from the machine by which they have been treated, and holding them for the drying action of the air until they may be removed from or discharged by the conveyor. An example of work of this character is furnished in connection with the coating with cement of soles for rubber shoes. Here, the soles are discharged from the cementing machine upon the conveyor-belt, which carries them for a considerable distance, as from one side of the room in which the apparatus is installed, toward the top and opposite side. If the length of travel is sufficient, the cement will have time to partially set, and the soles are removed in suitable condition for utilization. Obviously, such an arrangement occupied much space, and it is the aim of this invention to obtain necessary exposure of the cemented articles upon the conveying system with the occupation of relatively little room-space.

In accomplishing this, a feature of the invention involves a conveying system having portions movable in different directions, and movable means, acting to turn objects through an angle approaching 180 degrees and to transfer them from one of these portions to another. By this means, the travel of the conveyed objects may be reversed, so that their time of exposure may be doubled for the same length of room in which the conveying system operates. Preferably, I employ an endless conveyor, as a belt, having upper and lower runs, and transfer objects from one run to the other, so that not only is economy of space gained, but also of apparatus, since but one main or drying conveyor is needed. As illustrated, the transferring means is movable, so that a constant advancing tendency is exerted upon the partially dried objects, insuring their being carried forward without interference with each other. A desirable embodiment of the invention includes a main conveyor-belt, a series of rolls mounted upon an arcuate frame and receiving objects from the upper run of said conveyor-belt, and a conveyor-belt connecting the last roll of the series to the lower run of the main belt.

Figure 1:
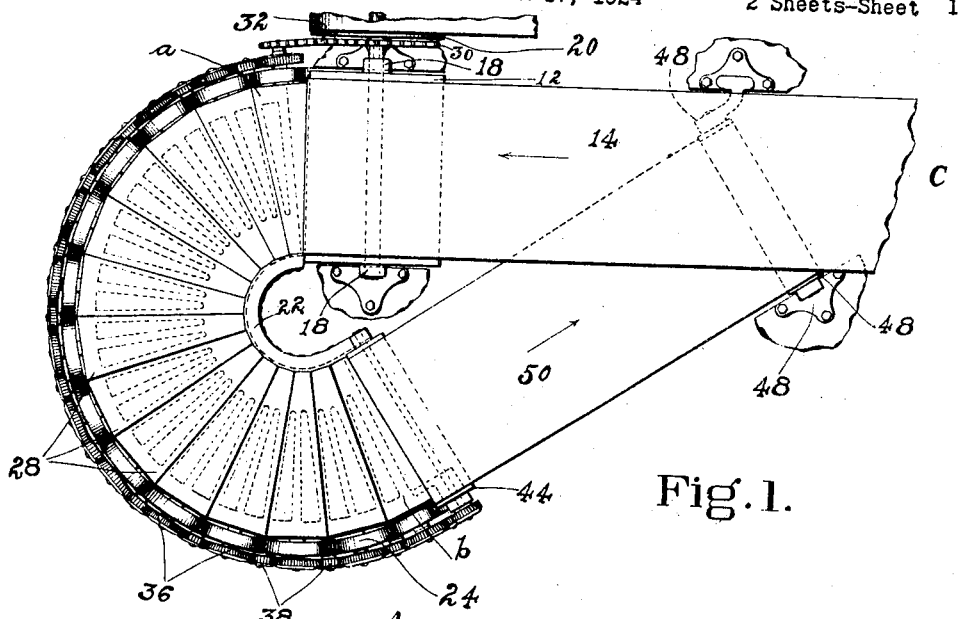
Figure 2:
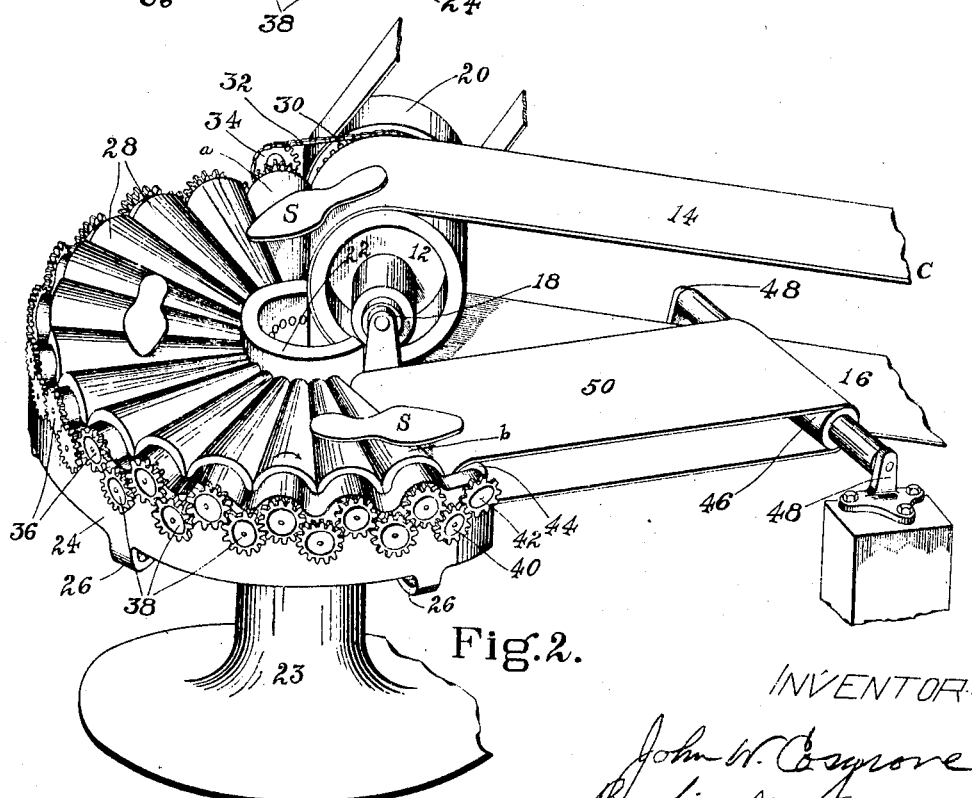
Figure 3:
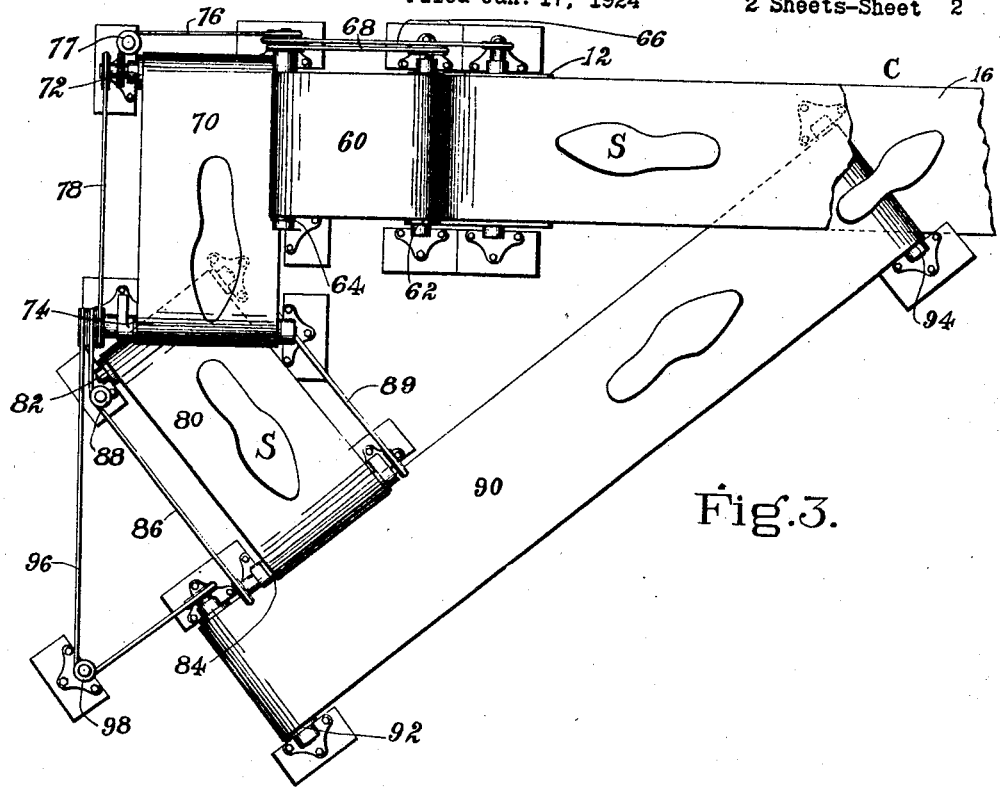

In the accompanying drawings,

Fig. 1 is a top plan view of a particular form of the invention;

Fig. 2, a perspective view thereof;

Fig. 3, a top plan view of another embodiment of the invention; and

Figure 4:
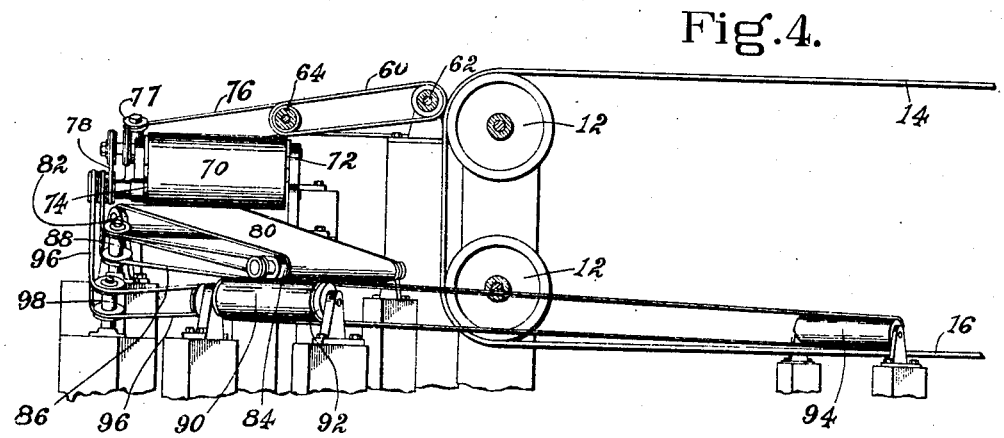

Fig. 4, a side elevation of the organization of Fig. 3.

Referring to Figs. 1 and 2, a main conveyor-belt C, suitable for the drying of cemented shoe-soles or the like, preferably runs from one side of the room in which it is installed, over the usual roll, which is not here illustrated, upwardly to the opposite side of the room about a roll 12. By means of the present invention, this belt is caused to have two conveying portions, furnished respectively by its upper run 14 and its lower run 16, these portions being movable in opposite directions. The roll 12 is rotatable in bearings 18, and is driven through a pulley 20 from a convenient source of power. Supported just in advance of and extending to one side of the roll 12 is an arcuate frame, consisting of an inner section 22, of relatively small diameter, carried upon a standard 23, and an outer section 24 concentric with the inner section and joined to it by intermediate bars 26. Arranged with journal-portions turning in the inner and outer sections are rolls 28, of conical form, these preferably being frustra of cones. The first roll a of the series is situated with its periphery closely adjacent and parallel to the upper run of the main conveyor, its smaller end pointing inwardly or toward the frame-section 22. The succeeding rolls of the series have their peripheries in substantial contact with the rolls upon each side of them, and extend in the same direction as the first roll, or converging inwardly. Their axes lie along a surface inclined gradually downwardly helically. This provides a conveying surface movable transversely of the main conveyor C and made up of the endless peripheries of the rolls, which leads gradually down from the upper run of said main conveyor, by a path curving through preferably 100 somewhat more than 180 degrees, to a lower level, which is just above the lower run of the conveyor. Fixed upon the journal of the roll 12 is a sprocket-wheel 30, connected by a chain 32 to a smaller sprocket-wheel 34 fast upon the spindle of the first roll $a$, so that the latter is caused to rotate whenever the conveyor C is in motion, the ratio of the gearing being such that the average peripheral speed of the roll is approximately the same as the rate of travel of the conveyor-belt. Secured upon each of the outer spindles of the rolls is a pinion 36, which meshes with an idler pinion 38 rotatable upon the frame-section 24, these roll-pinions and idlers causing the entire series of rolls to rotate in the same direction, as indicated by the arrow in Fig. 2, and at the same peripheral speed. The direction of this rotation is such that the upper surfaces of the rolls give a constant advancing tendency for objects delivered upon them from the upper run 14 of the conveyor. The pinion upon the last roll of the series, which is designated as $b$, turns an idler pinion 40 meshing with a pinion 42 upon the spindle of a cylindrical roll 44, journaled in the frame with its periphery parallel to the adjacent side of the roll $b$. Over the roll 44 and a like roll 46, journaled in bearings 48, 48 situated at opposite portions of the lower run 16 of the main conveyor, travels a short conveyor-belt 50, which receives objects advanced to it by the roll $b$ and deposits them upon the lower conveyor-run. The total angle through which the transfer is made between the upper and lower runs approximates 180 degrees, the direction of motion of the transferred objects being reversed, but alinement with the axis of the main conveyor being dependent upon the contact with the transferred objects of the lower run of the main conveyor.

Soles, as those indicated at S in Fig. 2, carried upwardly by the upper run 14 of the belt C from the machine by which they are coated, fall from the end thereof upon the first roll $a$ of the series 28. The latter, presenting a conveying surface moving at about the same speed as the conveyor, advances the sole to the next roll, this action continuing throughout the entire series, the sole being gradually turned as it moves forward, and at the same time lowered from the plane at which it was received. The upward inclination of the conical rolls toward their ends of greater diameter presents a resistance to the deflection of the soles outwardly, preventing displacement from the rolls, and they are gradually and uniformly turned toward the lower run of the conveyor through the effect produced by the more rapid rotation of the outer portions of greater diameter. When a sole reaches the last roll $b$, it is pointing toward the lower run 16, not far from the rear of the roll 12. At this time, it is received by the conveyor 50, and by this deposited upon said run 16. As the delivery takes place, the frictional engagement of the main conveyor with the forward portion of the sole turns it unitl its axis is generally alined with the direction of advance, so that the successive soles occupy the same relation upon the lower run as they did upon the upper. It is to be noted that since the transferring mechanism throughout is driven from the main conveyor, its operation will continue, as long as the latter device is traveling to discharge soles upon it, and only at such times. If any portion of the transferring mechanism contacting with the soles were stationary, or if it might become so while the main conveyor continued in operation, or if the main conveyor stopped with the transferring mechanism running, soles would tend to accumulate upon one or another stationary element, and pile together, causing them to adhere, and deranging the operation of the system.

In the embodiment of the invention illustrated in Figs. 3 and 4, the endless transferring conveyors take the form of belts, rather than rolls, as in Figs. 1 and 2. Here, the upper and lower runs of the main conveyor C are shown as somewhat more widely separated than in the previous instance, upon spaced rolls 12, 12. Traveling in proximity to the extremity of the upper run 14 of the main conveyor is a short conveyor-belt 60 extending in the same direction as said main conveyor and being somewhat downwardly inclined. This conveyor 60 is carried by rolls 62 and 64 suitably journaled. Belt-gearing 66 rotates the forward roll 64 from the upper roll 12 of the main conveyor at such a speed that the conveyors C and 60 advance at the same rate. The roll 64 is belted back at 68 to the rear roll 62, maintaining the conveyor 60 under proper tension, and insuring its travel without slipping. The outer end of the conveyor 60 terminates over a conveyor-belt 70, which is shown as lying at right angles to that delivering to it, and being similarly downwardly inclined. It is supported upon rolls 72 and 74, the former being belted at 76 to the roll 64, idler rolls 77 being employed to properly change the direction of the belt. The roll 74 is driven from 72 through belting 78. Beneath the end of the conveyor 70 is a succeeding conveyor 80 downwardly inclined and lying at an angle which brings its forward end toward the main conveyor C. Rolls 82 and 84 support the conveyor 80, 84 receiving motion by means of belt-gearing 86 from the roll 74, idlers 88 being utilized to guide the belt, while roll 82 is driven from roll 84 by belting 89. Substantially at right angles to the conveyor 80 operates a somewhat longer conveyor 90, the upper end passing over a roll 92, and the lower over a roll 94, which lies above the lower run 16 of the conveyor C.

Roll 92 is belted to the roll 74 at 96, an idler 98 directing the belt. Throughout, the ratio of the gearing is such that the rate of travel of the conveying surfaces of the transfer mechanism is approximately the same as that of the main conveyor. The action of this form of the transferring mechanism is generally similar to that previously described, except that the changes in direction are somewhat more abrupt, the soles, in each instance, as they pass from one conveyor to another, changing their angular direction, being straightened upon the receiving surface by its frictional engagement with their forward ends. Therefore, throughout the entire system, the relation of the soles to the belts carrying them remains the same.

Having described my invention, what I claim as new and desire to secure by Letters Patent of the United States is:

1. In a conveying system, conveying portions movable in different directions, and movable means acting to turn objects through an angle approaching 180 degrees and transfer them from one portion to the other.

2. In a conveying system, an endless conveyor having upper and lower runs, and continuously effective, endless means for transferring objects from one run of the conveyor to the other.

3. In a conveying system, a driven endless conveyor having upper and lower runs, transferring means movable through approximately 180 degrees between the upper and lower runs, and means for moving the transferring means.

4. In a conveying system, an endless conveyor having upper and lower runs, traveling transferring means extending across the end of the conveyor to receive objects from the upper run, and means for moving the transferring means transversely of the conveyor to deliver to the lower run.

5. In a conveying system, an endless conveyor having upper and lower runs, and traveling transferring means furnishing a curved path extending across the end of the conveyor to receive objects from the upper run and delivering to the lower run.

6. In a conveying system, a unitary conveying device having portions movable in different directions, and transferring means extending across the end of one of the portions to receive objects therefrom and delivering to another portion, said means being arranged to maintain the objects in constant motion during their transfer.

7. In a conveying system, an endless conveyor having upper and lower runs, and continuously movable means for transferring objects from the upper to the lower run and including an endless conveyor.

8. In a conveying system, an endless conveyor having upper and lower runs, a series of endless conveyors receiving objects from the upper run and delivering them successively from one to another of the series and to the lower run, and means for operating the conveyors.

9. In a conveying system, a conveyor-belt, and a series of co-operating conical transferring rolls connecting portions of the belt.

10. In a conveying system, a conveyor-belt, a series of co-operating conical transferring rolls receiving objects from the upper run of said belt, and a conveyor-belt to which the rolls deliver and which in turn delivers to the lower run of the first-named belt.

11. In a conveying system, a conveyor-belt, and a series of co-operating conical transferring rolls, said rolls having their axes converging toward one side of the belt and their peripheries closely adjacent to each other, one terminal roll of the series lying in proximity to the upper run of the belt and the other terminal roll approaching the lower run of said belt.

12. In a conveying system, a conveyor-belt, a series of co-operating conical transferring rolls, said rolls having their axes converging toward one side of the belt and their peripheries closely adjacent to each other, one terminal roll of the series lying in proximity to the upper run of the belt and the other terminal roll approaching the lower run of said belt, and a conveyor-belt extending between the last roll of the series and the lower run of the first-named conveyor-belt.

13. In a conveying system, an endless conveyor having upper and lower runs, and a movable transferring mechanism furnishing a curved path between the upper and lower runs and being higher at the outer side than at the inner.

14. In a conveying system, a conveyor-belt, and a series of conical transferring rolls receiving objects from the belt, said rolls being arranged side by side to furnish a curved path and having their portions of greater diameter at the outer side of said path, the series of rolls extending downwardly helically from the upper toward the lower run of the belt.

15. The combination with a conveyor-belt, of an arcuate frame situated adjacent to one extremity of said belt, and a transferring mechanism mounted upon the frame and connecting the upper and lower runs of the conveyor-belt.

16. The combination with a main conveyor-belt, of an arcuate frame situated adjacent to one extremity of said belt, and a series of rolls rotatable in the frame and extending from the upper run of said belt toward the lower run thereof.

17. The combination with a main conveyor-belt, of an arcuate frame situated adjacent to one extremity of said belt, a series of rolls rotatable in the frame and extending from the upper run of said belt toward the lower run thereof, and a conveyor-belt connecting the last roll of the series with the lower run of the main belt.

In testimony whereof I have signed my name to this specification.

JOHN W. COSGROVE.